US009639131B2

(12) United States Patent
Miller et al.

(10) Patent No.: US 9,639,131 B2
(45) Date of Patent: *May 2, 2017

(54) SYSTEMS, METHODS AND DEVICES FOR CONTROL OF THE OPERATION OF DATA STORAGE DEVICES USING SOLID-STATE MEMORY

(71) Applicant: Seagate Technology LLC, Cupertino, CA (US)

(72) Inventors: Michael Howard Miller, Eden Prairie, MN (US); Martin Ragnar Furuhjelm, Auburn, CA (US); Jonathan Williams Haines, Boulder, CO (US)

(73) Assignee: Seagate Technology LLC, Cupertino, CA (US)

( * ) Notice: Subject to any disclaimer, the term of this patent is extended or adjusted under 35 U.S.C. 154(b) by 203 days.

This patent is subject to a terminal disclaimer.

(21) Appl. No.: 14/274,097

(22) Filed: May 9, 2014

(65) Prior Publication Data
US 2014/0331071 A1    Nov. 6, 2014

Related U.S. Application Data

(63) Continuation of application No. 13/917,371, filed on Jun. 13, 2013, now Pat. No. 8,745,421, which is a
(Continued)

(51) Int. Cl.
*G06F 11/14* (2006.01)
*G06F 12/0804* (2016.01)
(Continued)

(52) U.S. Cl.
CPC ............... *G06F 1/263* (2013.01); *G06F 1/30* (2013.01); *G06F 11/1441* (2013.01);
(Continued)

(58) Field of Classification Search
CPC .. G06F 11/1441; G06F 12/0804; G06F 1/263; G06F 1/30; G06F 3/0656; G06F 3/0679
See application file for complete search history.

(56) References Cited

U.S. PATENT DOCUMENTS 4,510,400 A    4/1985 Kiteley
5,367,489 A    11/1994 Park et al.
(Continued)

OTHER PUBLICATIONS

N. Li, J. Zhang, and Y. Zhong, "A Novel Charging Control Scheme for Super Capacitor Energy Storage in Photovoltaic Generation System," DRPT2008 Apr. 6-9, 2008 Nanjing China.
(Continued)

*Primary Examiner* — Jaweed A Abbaszadeh
*Assistant Examiner* — Terrell Johnson
(74) *Attorney, Agent, or Firm* — Crawford Maunu PLLC

(57) ABSTRACT

A variety of data storage devices, methods and systems are implemented for control of memory associated with backup functionality. One such data storage device includes a power circuit that provides main power. The data storage device has a first solid-state memory circuit that maintains data in the absence of electrical power. A second memory circuit is subject to data loss in the absence of electrical power. A storage circuit stores energy and provides the stored energy to the second memory circuit in response to a loss of main power. A test circuit discharges a portion of the stored energy to provide output data indicative of power-providing capabilities of the storage circuit. A memory controller controls data transfers to the data storage device by temporarily storing data destined for the first solid-state memory circuit and setting the amount of memory available for temporary storage in response to the output data.

18 Claims, 6 Drawing Sheets

Related U.S. Application Data continuation of application No. 12/560,868, filed on Sep. 16, 2009, now Pat. No. 8,468,370.

(51) Int. Cl.
  *G06F 1/26* (2006.01)
  *G06F 1/30* (2006.01)
  *G06F 3/06* (2006.01)

(52) U.S. Cl.
  CPC .......... *G06F 3/0656* (2013.01); *G06F 3/0679* (2013.01); *G06F 12/0804* (2013.01); *Y02B 60/1225* (2013.01)

(56) References Cited

U.S. PATENT DOCUMENTS

| | | | |
|---|---|---|---|
| 5,459,850 A | 10/1995 | Clay et al. | |
| 5,483,486 A | 1/1996 | Javanifard et al. | |
| 5,497,119 A | 3/1996 | Tedrow et al. | |
| 5,537,360 A | 7/1996 | Jones et al. | |
| 5,546,042 A | 8/1996 | Tedrow et al. | |
| 5,567,993 A | 10/1996 | Jones et al. | |
| 5,592,420 A | 1/1997 | Cernea et al. | |
| 5,914,542 A | 6/1999 | Weimer et al. | |
| 5,959,926 A | 9/1999 | Jones et al. | |
| 6,091,617 A | 7/2000 | Moran | |
| 6,304,471 B1 | 10/2001 | Chalasani et al. | |
| 6,356,057 B1 | 3/2002 | Shilo et al. | |
| 6,404,647 B1 | 6/2002 | Minne | |
| 6,567,261 B2 | 5/2003 | Kanouda et al. | |
| 6,700,352 B1 | 3/2004 | Elliott et al. | |
| 6,788,027 B2 | 9/2004 | Malik | |
| 6,838,923 B2 | 1/2005 | Pearson | |
| 6,957,355 B2 | 10/2005 | Acton et al. | |
| 6,981,161 B2 | 12/2005 | Koo | |
| 7,019,583 B2 | 3/2006 | Del Signore, II et al. | |
| 7,173,821 B2 | 2/2007 | Coglitore | |
| 7,177,222 B2 | 2/2007 | Spengler | |
| 7,233,890 B2 | 6/2007 | Shapiro et al. | |
| 7,268,998 B2 | 9/2007 | Ewing et al. | |
| 7,269,755 B2 | 9/2007 | Moshayedi et al. | |
| 7,305,572 B1 | 12/2007 | Burroughs et al. | |
| 7,310,707 B2 | 12/2007 | Olds et al. | |
| 7,318,121 B2 | 1/2008 | Gaertner et al. | |
| 7,321,521 B2 | 1/2008 | Spengler | |
| 7,334,144 B1 | 2/2008 | Schlumberger | |
| 7,404,073 B2 | 7/2008 | Felts | |
| 7,404,131 B2 | 7/2008 | McCarthy et al. | |
| 7,414,335 B2 | 8/2008 | Hussein et al. | |
| 7,487,391 B2 | 2/2009 | Pecone et al. | |
| 8,090,905 B2 | 1/2012 | Stenfort | |
| 2004/0054484 A1* | 3/2004 | Farabaugh | G01R 31/3631 702/63 |
| 2004/0257044 A1 | 12/2004 | Nagaoka | |
| 2006/0080515 A1 | 4/2006 | Spiers et al. | |
| 2006/0140069 A1 | 6/2006 | Hayashi | |
| 2007/0033431 A1* | 2/2007 | Pecone | G06F 1/28 714/6.12 |
| 2007/0033432 A1 | 2/2007 | Pecone et al. | |
| 2007/0223870 A1 | 9/2007 | Farling et al. | |
| 2008/0007219 A1 | 1/2008 | Williams | |
| 2008/0232144 A1 | 9/2008 | Klein | |
| 2009/0006877 A1 | 1/2009 | Lubbers et al. | |
| 2009/0189451 A1 | 7/2009 | Roepke | |
| 2010/0329064 A1 | 12/2010 | Wilson | |

OTHER PUBLICATIONS

ECNmag.com, "1.2A, 1.6MHz Synchronous Boost Regulator from Linear Technology," Top News, Jan. 8, 2009.

Intel® Mainstream SATA Solid State Drives, "Intel® X25-M and X18-M Mainstream SATA Solid-State Drives".

"Get the Lowdown on Ultracapacitors," Penton Media, Inc., Nov. 15, 2007.

STMicroelectronics, "Regulating Pulse Width Modulators, SG3524," Jul. 2000.

Linear Technology, "1.2A Synchronous Step-up DC/DC Converter with Input Current Limit, LTC3125," 2008.

* cited by examiner

SYSTEMS, METHODS AND DEVICES FOR CONTROL OF THE OPERATION OF DATA STORAGE DEVICES USING SOLID-STATE MEMORY

RELATED PATENT DOCUMENT

This is a continuation under 35 U.S.C. §120 of U.S. patent application Ser. No. 13/917,371 filed on Jun. 13, 2013; which is further a continuation of U.S. patent application Ser. No. 12/560,868 filed on Sep. 16, 2009 (U.S. Pat. No. 8,468,370), to each of which priority is claimed.

FIELD OF THE INVENTION

Aspects of the present invention relate to control of the operation of electrical data storage devices and systems that can be particularly useful for control of memory usage in applications that use solid-state memory and a backup power source used during a loss of electrical power.

BACKGROUND

Electronic data storage devices provide access (storage and retrieval) to data under the control of electrical signaling. Many different recording mediums exist for storing the data, each having different characteristics and parameters. Memories used in data storage devices can be classified into volatile memories and non-volatile memories. Non-volatile memories, e.g., those using magnetic recording media or floating-gate transistors, maintain stored data in the absence of electrical power. Volatile memory, such as Dynamic-Random-Access-Memory (DRAM) or Static-Random-Access-Memory (SRAM), will lose stored data when electrical power is removed.

Magnetic-based memory stores data by magnetizing a magnetic recording medium in a particular orientation. Data is read by passing a sensor over the magnetized areas to detect the orientation of the stored magnetic fields. A use for magnetic recording media is to position read-write heads near rotating magnetic platters. Magnetic recording media have the advantage of being non-volatile due to the use of a magnetized medium, which does not require electrical power to maintain stored-data integrity.

Solid-state memory refers to devices that use semiconductor technology as the storage medium. One type of solid-state memory is non-volatile flash memory. Non-volatile flash memory operates by storing charge on a floating gate of a memory cell. In particular, non-volatile flash stores data by charging a floating gate that maintains the stored charge in the absence of electrical power. Flash memory also has the added benefit of not being as susceptible to mechanical perturbations because it does not require movable parts to access the storage medium.

A particular field of use for both solid-state memory and magnetic-based memory relates to storage devices accessible by electronic systems, and more particularly, computer systems. For example, a conventional hard disc drive (HDD) includes a rotating magnetic media that is accessed under the control of electrical signals provided by an electronic control circuit. Another type of data storage device is a solid-state device/drive (SSD) that uses solid-state memory accessed under the control of electrical signals. When viewed from a programming or memory-hierarchical perspective, HDDs and SSDs can look similar or even identical. From a practical standpoint, however, these drives often exhibit a number of important differences including, but not limited to, access speeds, power consumption, reliability and susceptibility to data loss due to mechanical vibrations or sudden power loss.

For a variety of reasons, (e.g., access times or wear from erasure cycling) accesses (reads or writes) to HDDs and SSDs can be facilitated using a volatile memory for temporary storage during normal operation of the HDD or SSD. Traditional HDDs and SSDs receive their primary operating power from an external source, such as the computer system that accesses the data stored therein. Before shutdown of the HDD/SSD, data from the volatile memory can be stored/written to the non-volatile memory. A sudden/unexpected loss of power from the external source, however, may require a local/backup source of energy to prevent data in the volatile memory from being lost. HDDs can utilize the kinetic energy from the spindle motor to briefly maintain drive supply voltages in the event of an unexpected power loss. For example, back-electromotive force (EMF) is converted into electrical power and the drive is allowed to write data from a temporary/volatile cache to the non-volatile rotating magnetic media. The lack of rotating media in SSDs results in alternative solutions, one of which is the use of a backup power supply. The backup power supply provides energy that facilitates transfers of data from the volatile memory to the non-volatile memory in the event of a loss of power.

Improvements and applications relating to these and other aspects of storage devices are contemplated.

SUMMARY

The present invention is directed to systems and methods for use with data storage devices that use backup power supplies to address data integrity issues due to power loss. These and other aspects of the present invention are exemplified in a number of illustrated implementations and applications, some of which are shown in the figures and characterized in the claims section that follows.

Consistent with one embodiment of the present invention, a storage device is configured with a backup power source. The backup power source provides power to the storage device in the event of a loss of primary operating power. In response to such a loss of primary operating power, temporary data stored in a volatile memory is written to a non-volatile memory to preserve data. A control circuit receives information about the energy available, the information being at least partially gained from active testing of the backup power source. In response to the information about the energy available, the control circuit adjusts usage parameters for the volatile memory to reduce the amount of energy required during the writing of the temporary data, thereby guaranteeing data integrity of the temporary data.

Consistent with another embodiment, a data storage device is implemented having a power circuit configured and arranged to provide main power. The data storage device also has a first solid-state memory circuit configured and arranged to maintain data in the absence of electrical power. A second memory circuit is included that is subject to data loss in the absence of electrical power. A capacitive storage circuit is configured and arranged to store energy and to provide the stored energy to the second memory circuit in response to a loss of main power. A test circuit is electrically connected to the capacitive storage circuit to discharge a portion of the stored energy and to provide, in response to discharging, information indicative of energy-providing capabilities. A memory controller is configured and arranged to control data transfers to the storage device by temporarily storing, in the second memory circuit, data destined for the first solid-state memory circuit. The memory controller is also configured and arranged to set the amount of memory available for temporary storage in response to the information about the available energy.

The above summary is not intended to describe each illustrated embodiment or every implementation of the present invention.

BRIEF DESCRIPTION OF THE DRAWINGS

The invention may be more completely understood in consideration of the detailed description of various embodiments of the invention that follows in connection with the accompanying drawings as follows.

DETAILED DESCRIPTION

Figure 1A:
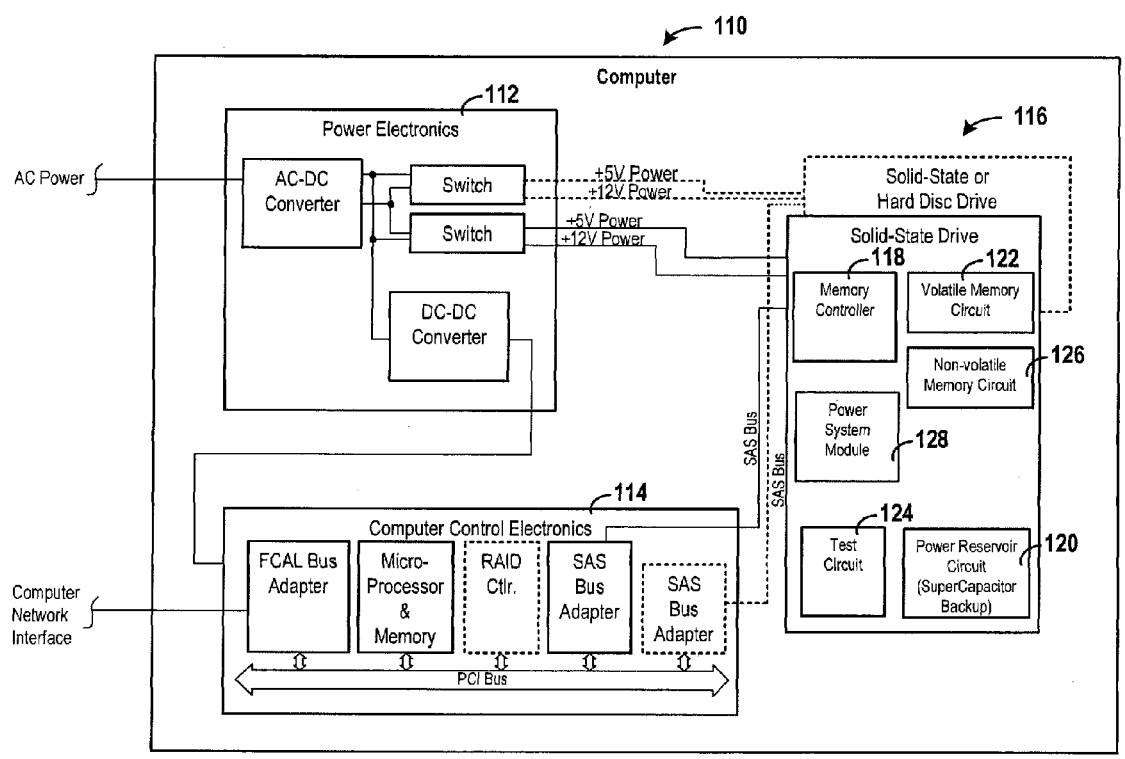
FIG. 1A shows a computer system configured for operating a solid-state memory device having an external boost regulator circuit, according to an example embodiment of the present invention.

Aspects of the present invention are believed to be useful for controlling memory usage for solid-state memory devices, circuits and systems. A particular application of the present invention relates to solid state devices/drives (SSDs) that provide non-volatile memory storage functions in the form of a data storage device. While the present invention is not necessarily limited to such applications, various aspects of the invention may be appreciated through a discussion of various examples using this context.

A particular embodiment of the present invention relates to a storage device that includes a power circuit configured and arranged to provide main power. A non-volatile solid-state memory circuit maintains data in the absence of electrical power. A volatile memory circuit stores data but is subject to data loss in the absence of electrical power. A capacitive storage circuit stores energy and provides the stored energy to the second memory circuit in response to a loss of main power. A test circuit electrically connects to the capacitive storage circuit. When the test circuit is enabled, a portion of the stored energy is discharged. This discharge provides an indication of energy storage capabilities. Information is generated or provided in response to the indication. A memory controller controls data transfers to the storage device by temporarily storing, in the second memory circuit, data destined for the first solid-state memory circuit. The amount of memory available for temporary storage is set according to the energy storage information.

Data stored in temporary/volatile memory/cache locations of an SSD can be lost in the event of an unexpected loss of power. To address this issue, a secondary power source can be used to provide power to the SSD in the event of unexpected losses of power, thereby allowing for data from a temporary/volatile cache to be written to the non-volatile SSD memory. Two, non-limiting, examples of secondary power sources include a battery and a capacitor circuit. A controller detects a loss of power from the primary supply and engages the secondary power source. The contents of volatile memory circuits are then transferred to non-volatile memory circuits. For further details on one example of how to implement such a controller, reference can be made to U.S. Pat. No. 7,269,755 to Moshayedi et al., which is fully incorporated herein by reference.

Both batteries and supercapacitors, also referred to as ultracapacitors or double-layer capacitors, are elements that can be subject to reliability issues. For instance, the energy-storage capabilities of both batteries and capacitors can degrade over time. If the degradation is severe, the energy-storage capabilities of the backup power source may be insufficient to ensure all data is written from the volatile memory circuit during a power-loss event.

New technologies in the capacitive storage arena are emerging. These technologies offer improvements in storage capacity, capacity-to-size ratios, equivalent-series resistances (ESR) as well as other areas. Various ultra/super capacitor technologies have suffered from problems with reliability and life-expectancy. Newer technologies have been developed (and are currently being developed) to improve upon the reliability and life-expectancy of capacitor technology. These improvements suggest that supercapacitor usage can be expanded into new areas and used more effectively in existing areas. For all of the suggested promise of such newly developed technology, however, the improved reliability and life-expectancy is necessarily only a prediction of long-term reliability. In particular, long-term reliability for technology that has only been in existence for a short-period of time is, at best, based upon projections. Recognizing this often-overlooked problem, aspects of the present invention are particularly useful for addressing the uncertainty in the reliability and life-expectancy of such new technology. Moreover, new supercapacitor technology is on the horizon. Knowledge of these characteristics is of particular import for applications that demand high-reliability. Many such systems require that critical components meet minimum reliability criterion. Without hard data on the reliability of the super capacitors, it is only possible to use predictive models to estimate long-term failure characteristics. Prediction-only knowledge of supercapacitors, however, can be insufficient to guarantee sufficient reliability depending upon the application. Aspects of the present invention can be particularly useful for addressing these and other problems associated with supercapacitors.

Various embodiments of the present invention relate to active testing of the power/energy-providing capabilities of the power/energy storage element (PSE) (e.g., supercapacitor). This testing can be implemented by discharging some, or all, of charge stored on the PSE. For applications in which testing occurs while the SSD is in use, partial discharging can be implemented to maintain sufficient charge in the event of a sudden power-loss immediately following, or during, a discharge-test.

Embodiments of the present invention provide active testing of the PSE by increasing the voltage/charge on the PSE during the active testing. Increasing the voltage increases the amount of available energy and can be used to maintain sufficient energy on the PSE during the active test. For instance, the PSE can be configured to operate at 5 V during normal operation. During an active test, the voltage is raised to 6 V. The PSE can then be discharged from 6 V to a desired voltage (e.g., back down to 5 V). This can be particularly useful for allowing the memory device to continue normal operations while maintaining sufficient stored energy to provide backup functionality. Moreover, voltage/current characteristics can be monitored during charging of the PSE and then used to assess the power/energy providing capabilities of the PSE. As discussed herein, examples of power/energy-providing capabilities include, but are not limited to, one or more of total available energy, current-voltage characteristics and equivalent-series resistances (ESR).

Potential integrity concerns for the PSE can be determined as a function of a time period during which the PSE is expected to provide power. For a supercapacitor, the power-providing capabilities can be measured as a function of a charge depletion period. During this period, the super capacitor should be capable of providing an amount of energy sufficient to operate the memory circuits of the SSD. The time period is a function of the time necessary to ensure that all data is flushed from the cache and written to the non-volatile memory. In certain embodiments, the charge depletion period is substantially more than the minimum time period to ensure that there is a margin of error. This margin of error can be, for example, between five percent and twenty percent.

Embodiments of the present invention use data, such as power-providing test results to control the amount of volatile data stored at any given time. Generally speaking, the amount of energy required to safely backup an SSD device that suffers a power loss event is dependent upon the amount of volatile data that is in use. Accordingly, the power-providing capability of the PSE is correlated to an amount of volatile data that can be stored at any one time. The control over the amount of volatile data can be accomplished, for example, by disabling some of the available volatile memory.

Determination of the energy-providing capabilities of the PSE can be made as a function of a number of different factors. A few non-limiting examples include voltage, temperature, startup status, age and/or predictive modeling. Likewise, the required energy for a backup function can be made as a function of a variety of factors, such as active volatile memory size, SSD mode, type of memory, age of device, temperature and/or operating voltages.

Aspects of the present invention are directed toward a power system module (PSM) that provides control over memory and other functions of the SSD. The PSM can also provide an interface between the SSD and the overall computer system. In a particular implementation, the PSM has multiple operating modes. These operating modes can be entered and controlled by the PSM and/or in response to an external device. The various operating modes can correspond to different amounts of available volatile data. For example, a high-performance mode enables all volatile data on the SSD; an intermediate-performance mode enables only a subset of the volatile data, and a low-performance mode can disable all volatile data. A variety of different granularities can be accomplished using additional modes. Other modes can control aspects including, but not limited to, control of inrush current (e.g., during charging of the PSE) and extended-life mode (e.g., reducing voltage stored on the PSE to increase life-expectancy).

In a particular implementation, the PSM can provide information about the current energy storage capabilities/capacity of the PSE. An external device (e.g., computer programmed with a software driver) can access this information and respond accordingly. For instance, the external device can set the mode of the PSE based upon this information.

Turning now to the figures, FIG. 1A shows a computer system configured for operating a solid-state storage device having an external boost regulator circuit, according to an example embodiment of the present invention. The computer system includes a computer 110 that includes one or more SSDs 116. SSDs 116 have the capability of providing backup power, using energy reservoir circuit 120, in response to a system power interruption. Computer control electronics 114 control the flow of data between the processing elements of the computer, memory storage elements (e.g., solid-state/hard drives 116) and various computer interfaces (e.g., network interfaces or display devices). The computer 110 includes power electronics 112 that receive power from an external source, which can include, as examples, alternating current (AC) sources or batteries. The power electronics 112 generate one or more direct current (DC) voltages (e.g., 5 V or 12 V) and provide the generated DC voltages to the necessary computer components, including SSD 116.

Within SSD 116, memory controller 118 controls access to volatile memory 122 and to non-volatile memory 126. SSD 116 also includes a backup power/energy-reservoir circuit 120 for providing operating power for the solid-state drive in the event of a power loss. In a specific implementation, the backup power-reservoir (energy storage) circuit 120 includes one or more energy storage units, such as supercapacitors, for storing backup energy used during a power-loss event. In response to such a power loss event, data stored in the volatile memory 122 is written to the non-volatile memory 126.

SSD 116 also includes a test circuit 124 for testing the power-providing capabilities of the power-reservoir circuit 120. In a specific implementation, the test circuit 124 includes a load for discharging energy stored by the power-reservoir circuit 120. The discharge characteristics observed during the test are used to indicate the current state of a PSE of the power-reservoir circuit 120.

The power system module (PSM) 128 provides control, and information about, the power-reservoir circuit 120 and/or the state of the volatile memory 122. For instance, PSM 128 can control the amount of volatile memory 122 that is available for use by SSD 116. The PSM 128 can also initiate tests performed using test circuit 124. The computer control electronics 114 can communicate with PSM 128 to obtain data about the status of the SSD 116 and to control the functions of PSM 128. Although depicted as two distinct boxes, PSM 128 and memory controller 118 can be implemented on the same chip or use the same logic circuit or processor.

An example implementation allows for computer control electronics 114 to request information about the current energy-providing capabilities of the power-reservoir circuit 120. PSM 128 responds to the request by providing the desired information. In response, computer control electronics 114 sends control instructions to set a desired mode for PSM 128. This mode can determine the amount of volatile memory 122 that is enabled for use.

According to another example implementation, PSM 128 functions more autonomously. PSM 128 can operate in response to a set of parameters that determine the correct mode. Thus, PSM 128 can determine the amount of volatile memory 122 that should be enabled based upon the power-providing capabilities of the power-reservoir circuit 120. PSM 128 then enables/disables portions of volatile memory 122 accordingly. In this manner, PSM 128 can control the volatile memory 122 without external input.

Combinations and variations of these two example implementations are also contemplated. For instance, the parameters of a more autonomous mode can be set or adjusted by computer control electronics 114. In another instance, the determination of PSM 128 can set a limit on the amount of volatile memory 122 that is enabled, and computer control electronics 114 can set the amount of volatile memory up to, but not exceeding, this limit.

In one embodiment of the present invention, the SSD 116 is implemented within a traditional hard drive form factor. The electrical interface between the drive 116 and the computer is shown as a SAS (serially-attached SCSI (Small Computer System Interface)), but is not limited to any specific hard drive specification or interface. A few non-limiting examples include ATA (advanced technology attachment), SATA (serial advanced technology attachment), SCSI and/or FireWire.

According to an alternative embodiment of the present invention, the solid-state drive 116 is implemented according to a non-traditional form factor. In particular, solid-state drives do not contain mechanical disks and motors associated with traditional magnetic disk drives. This allows for more freedom in the design and placement of the various circuits, such as the memory controller circuit, the non-volatile memory circuit, the energy reservoir circuit (if used) and the energy-storage devices, such as supercapacitor(s). In a specific implementation, the power-reservoir circuit 120 can be placed on a different circuit board. This can be useful for allowing shared use of the circuit between multiple solid-state devices.

Figure 1B:
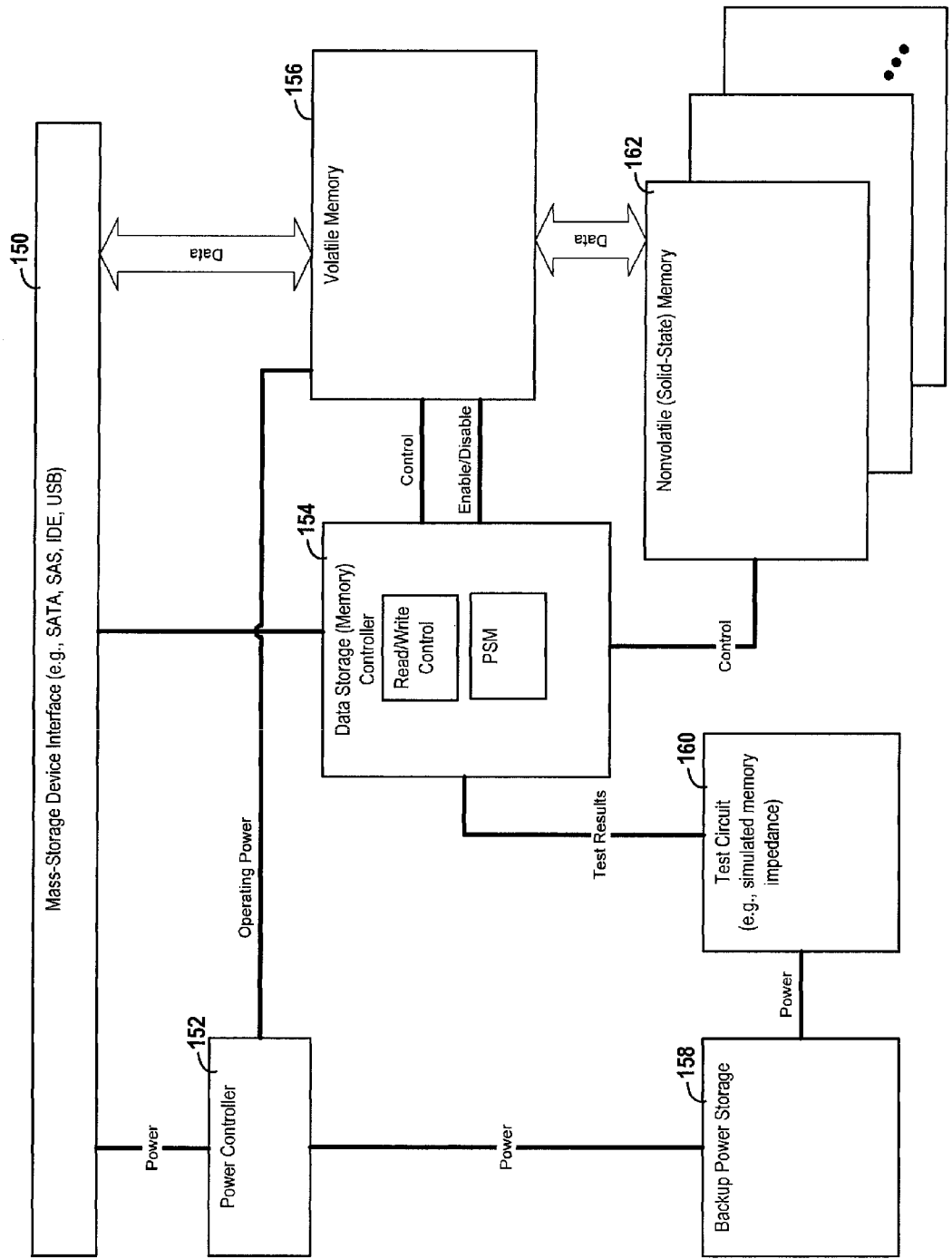
FIG. 1B depicts a block diagram for an SSD, consistent with an embodiment of the present invention.

FIG. 1B depicts a block diagram for an SSD, consistent with an embodiment of the present invention. Mass storage device interface 150 provides access to the SSD through use of a suitable communication protocol. Interface 150 also provides power for operating the SSD.

The SSD includes volatile memory 156 and non-volatile memory 162. Access to these memories is facilitated or controlled by data storage (memory) controller 154. Memory controller 154 also provides PSM functions. Power controller 152 routes power received from interface 150 to the components of the SSD. This includes providing power to backup storage 158 to allow charging of a PSE and routing power from the backup storage to the components of the SSD in response to a loss of power from the interface 150.

Test circuit 160 determines the power-providing capabilities of the backup storage 158 by discharging at least a portion of electrical energy stored on a PSE of the backup storage 158. This allows for a determination of the power-providing capabilities of the PSE. For instance, the voltage drop seen on the PSE can help determine how much power or energy is able to be provided. Another component of the determination could be how quickly the PSE charges after being discharged. Information from the determination can be stored in the memory controller for use by the PSM.

The PSM can control the available size of the volatile memory 156 according to the power-providing capabilities of the PSM. For instance, the results obtained from test circuit 160 can be used to determine a period of time that the PSE can provide sufficient power to the SSD. This period of time is correlated to the amount of time necessary to backup a certain amount of memory from the volatile memory 156. The available size of the volatile memory 156 can thereby be determined and set to ensure that there is sufficient backup power for the enabled size of the volatile memory.

One aspect of the volatile memory size relates to the block-write size. Some SSD memory chips operate by first erasing currently stored data and then programming the new data. For example, NAND flash chips often erase data in blocks and program data in pages, where a block is larger than a page. For example, a page might be 4K bytes, while an erase block might be 256K bytes. Packets of data received from a host into a data storage device are typically received as one or more logical blocks (512-byte logical blocks are a popular size). Since the NAND flash chips used in some SSDs may contain erase and page block sizes that do not match the sizes of data being written by the host system, it is often desirable to temporarily contain the data for write commands in volatile memory (caching) until additional write data is received. Accordingly, the memory control can include an adjustment of the amount of data stored before a memory erasure/write operation is performed.

In a particular implementation, the volatile memory can be completely disabled (e.g., a write-through mode). For such implementations, the PSE can be completely (or partially) discharged. This can be particularly useful for when the capabilities of the PSE have severely degraded or when performance is not critical. In particular, the life-expectancy of many PSEs, such as supercapacitors, is a function of the voltage level applied as well as the length of time for which the voltage is applied. Thus, the life-expectancy of the PSE can be increased by lowering or removing stored voltage.

In one embodiment of the present invention, the voltage level stored on the PSE can be adjusted according to the desired/required power. This allows for a tradeoff between performance, with high voltages and large volatile memory sizes, and extended life-expectancy of the PSE, due to lower voltage associated with smaller volatile memory sizes.

Figure 2:
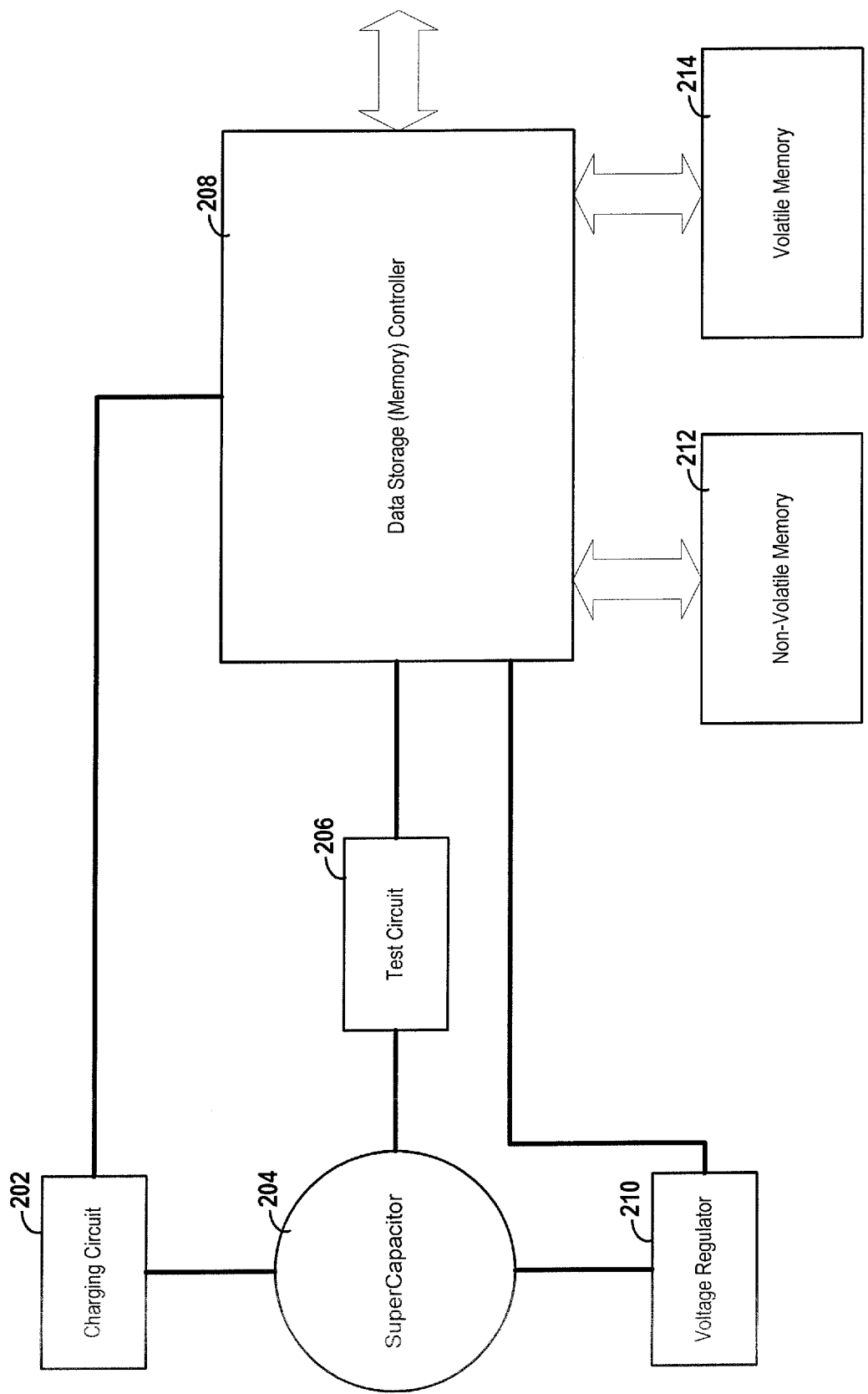
FIG. 2 depicts a block diagram for a super-capacitor management system, consistent with an embodiment of the present invention.

FIG. 2 depicts a block diagram for a super-capacitor management system, consistent with an embodiment of the present invention. The system includes a super-capacitor 204 that is charged by charging circuit 202. Charging circuit 202 can be directly connected to a power supply voltage or can be implemented using a voltage regulator that provides a desired voltage for charging of the super-capacitor 204. Voltage regulator 210 provides power to system controller 208 in the event of power loss. Data storage (memory) controller 208 controls accesses to and from volatile memory 214 and non-volatile memory 212. Memory controller 208 also controls the activation of the test circuit 206, which tests the power-providing capabilities of the super-capacitor 204 by discharging a portion of the stored energy. In response to this test, memory controller 208 can determine the amount of energy available from the super-capacitor 204. This determination can either be used directly by memory controller 208 or provided to another processing circuit for determining the proper setting for the enabled size of volatile memory 214.

Figure 3:
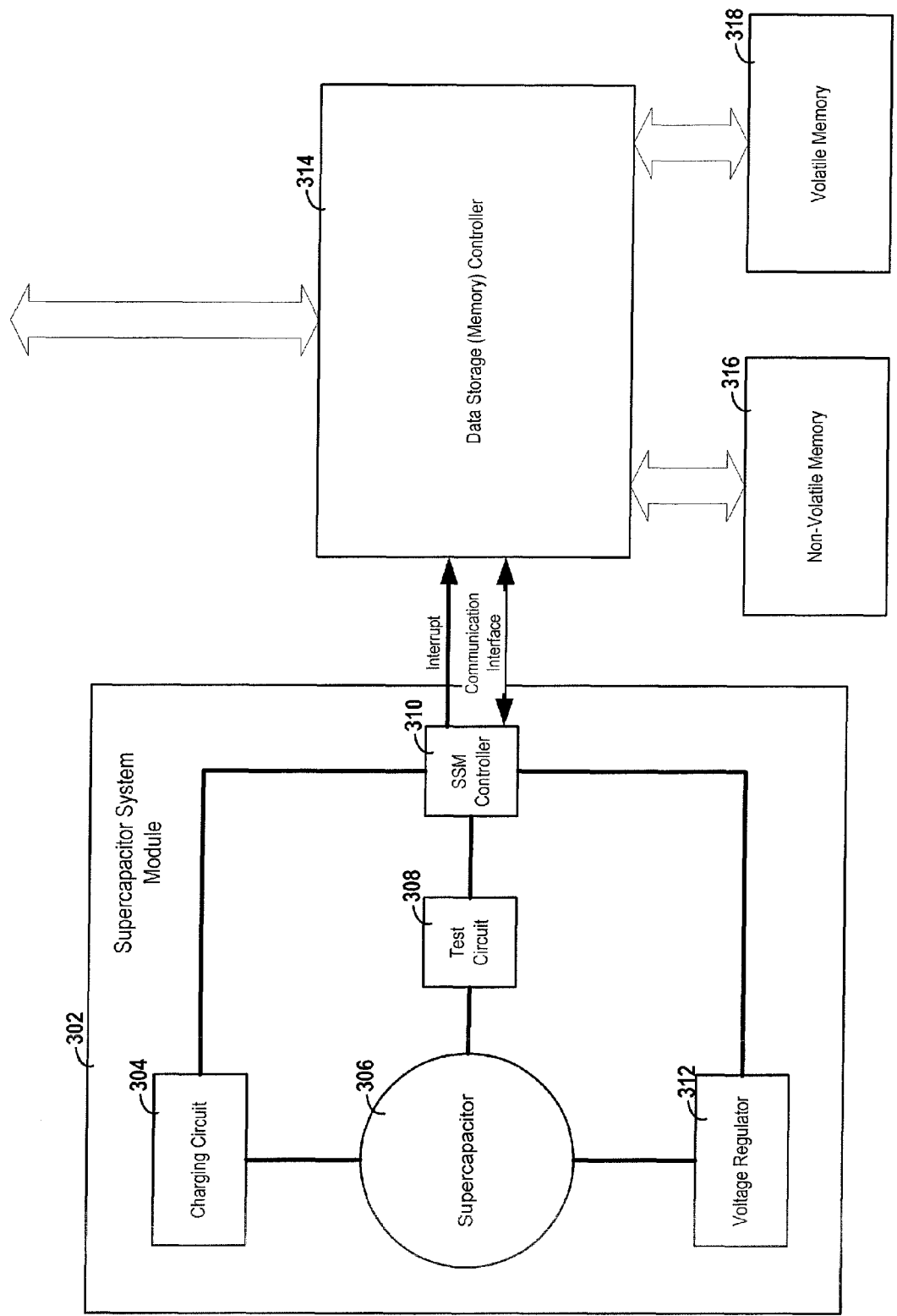
FIG. 3 depicts a system that includes a super-capacitor system module, consistent with an embodiment of the present invention.

FIG. 3 depicts a system that includes a super-capacitor system module, consistent with an embodiment of the present invention. A super-capacitor system module (SSM) 302 provides functionality associated with backup power-providing capabilities, testing and reporting. Charging circuit 304 provides power for charging the super-capacitor 306. Voltage regulator 312 provides power used for backup purposes, in the event of a power loss. Test circuit 308 provides an active test for the super-capacitor. Data storage (memory) controller 314 controls accesses to non-volatile memory 316 and volatile memory 318.

The memory controller 314 and the SSM controller 310 communicate data stemming from the results of the test circuit 308 and other parameters (e.g., charge voltage and temperature) for the purpose of altering the function of the memories 316 and 318. For instance, the SSM controller can operate in various modes that are controlled by the issuance of commands over the communication interface.

One mode is a test mode that initiates a test of the super-capacitor 306 using test circuit 308. During a test mode, the super-capacitor discharges energy under control of the test circuit. This discharge can temporarily lower the amount of available backup power. Using the communication interface, the data storage controller can be informed of the current available energy and adjust the usage of the volatile memory accordingly. Similarly, as the energy storage capacity of the super-capacitor degrades over time (detected by the test circuit 308) the available energy will decrease. This information is also provided over the communication interface and used to adjust the parameters of the memories accordingly.

For critical information, such as a complete failure of the super-capacitor, an interrupt or similar mechanism can be used. For instance, if a test indicates that the super-capacitor will be unable to provide sufficient energy for backup-functions (e.g., the power-providing capabilities degrade below a threshold level), then an interrupt can be triggered to inform the memory controller 314. Memory controller 314 can then disable the volatile memory by placing the system in a write-through mode that bypasses the volatile memory.

The communications interface also allows for the data storage controller to control aspects related to the inrush current, charging voltage or other factors. If not limited, the inrush current can be particularly high when initially charging the super-capacitor. Accordingly, the data storage controller can set an appropriate limit for the inrush current, as well as delay the time to charge each super-capacitor, respectively. For instance, the host can stagger the charging of multiple SSD's to offset current draw required by each SSD. The voltage to which the super-capacitor is charged affects both the life-expectancy of the super-capacitor and the amount of energy available for the backup procedure. Accordingly, the data storage controller can select a charging voltage that represents an appropriate tradeoff between these two goals.

Figure 4:
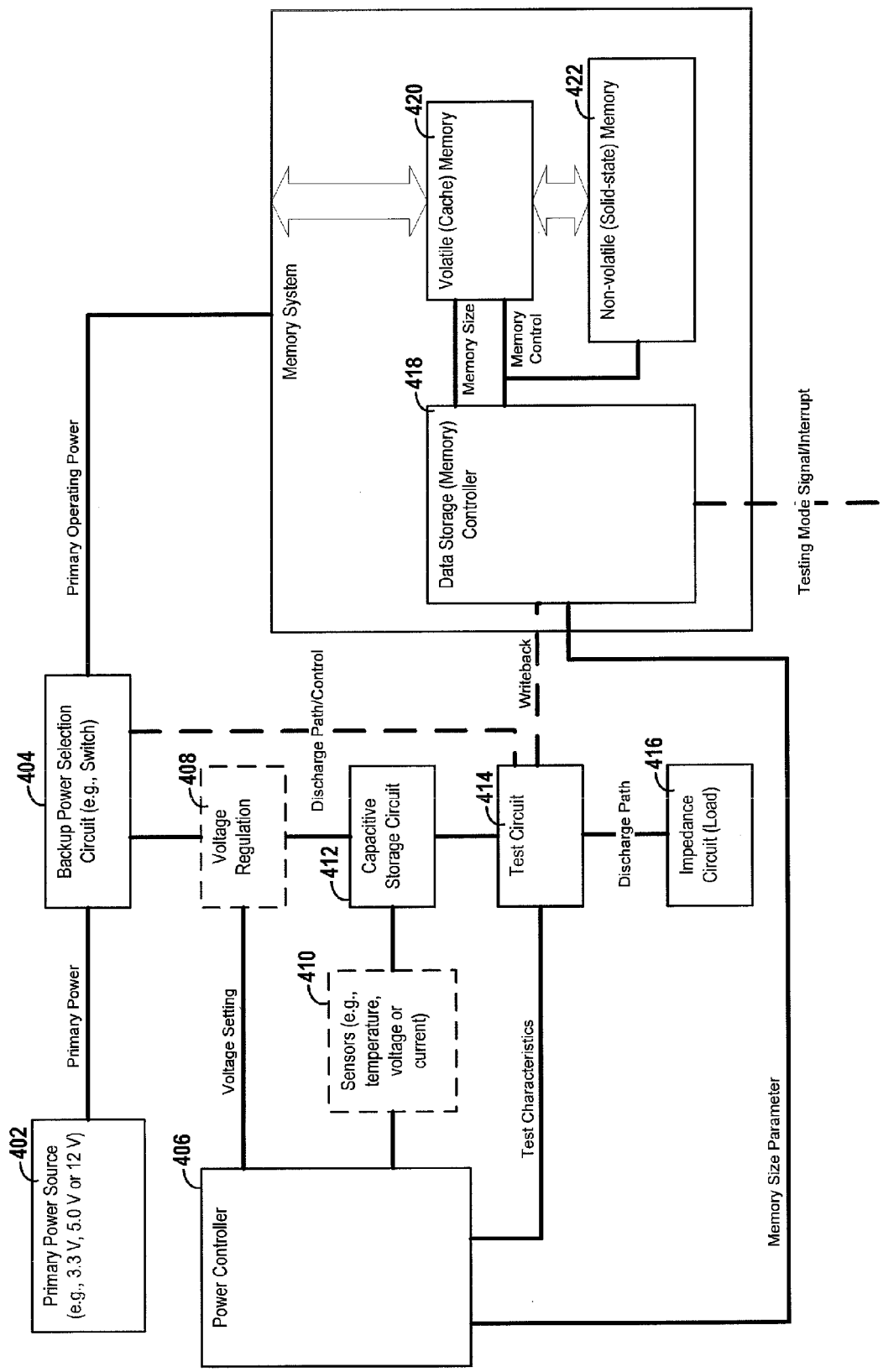
FIG. 4 depicts a block diagram of a system for controlling access to volatile memory circuit as a function of available backup energy, consistent with an embodiment of the present invention.

FIG. 4 shows a block diagram of a data storage system for controlling access to a volatile memory circuit as a function of available backup power, consistent with an embodiment of the present invention. Primary power source 402 provides power used during standard operation of the data storage system. Backup power-selection circuit 404 routes power from primary power source 402 to the data storage system and to the PSE 412. Optionally, voltage regulator 408 can provide a controllable voltage level for charging the PSE 412. The voltage output of voltage regulator 408 can operate under the control of power controller 406.

Power controller 406 determines an amount of currently available power on the PSE 412. This determination can be made from information received from temperature, voltage and/or current sensors 410, as well as from the results of power testing of the PSE 412. Testing can be accomplished using test circuit 414. Test circuit 414 controls discharging of PSE 412 through an impedance circuit 416. Impedance circuit 416 can be implemented using a resistive load, an active load, such as a current source, or other suitable circuits. The ability of PSE 412 to provide power is quantified by power controller 406. This quantified information is provided to memory controller 418.

Memory controller 418 sets the available size of volatile (cache) memory 420 in response to the information from power controller 406. Memory controller 418 is also able to send control instructions to power controller 406 to modify the amount of stored energy. Power controller 406 responds to such instructions by setting the voltage regulator to a corresponding voltage.

In a particular implementation of a test, the data storage system can first flush the cache and then implement a write-through mode. In a write-through mode, consistency between the volatile and non-volatile memory is maintained by writing to both memories at the same time. A similar implementation disables the volatile memory 420 during a test. In this manner, the reduction of energy stored on PSE 412 caused by the test will not threaten data integrity if power loss were to occur during or immediately following a test.

In an alternative embodiment, the discharge test for PSE 412 can be implemented by providing power to the data storage system. In this manner, the test results intrinsically include the actual draw of the data storage system. If desired, this test can be accomplished by temporarily disabling external accesses to the data storage system. A testing mode signal or interrupt can indicate that the drive is temporarily unavailable. To avoid potential loss of data due to insufficient power on the PSE 412, the volatile memory 420 can be flushed. This ensures that all data in the volatile memory 420 has been stored in the non-volatile (solid-state) memory 422 before the test begins. A test data pattern can then be loaded into the volatile memory 420, or the current state of the cache memory can be used. The system then disables the primary power source so that the data storage system is powered by the PSE 412. A simulated backup procedure for flushing the volatile memory 420 is then implemented to accurately model the power draw of the data storage system. If desired, an area of memory can be reserved for storing the backup data. Once the test completes, the performance of the PSE 412 can be assessed by power controller 406. The validity of the data stored in the reserved area can also be verified.

In some implementations, many of these functions can be prompted or otherwise implemented using an external control system, such as software executed by a computer processor. The software can be designed to monitor the status of the PSE 412. The software can periodically request status information about the PSE and respond accordingly. Alternatively, the software can set trigger points or threshold levels that cause a flag or interrupt to be set. The software will then respond accordingly. For instance, the software can set voltage level trigger points corresponding to charge level of the PSE. These trigger points can be active during a test and/or during normal operation. If desired, the trigger points can be associated with different interrupt levels or types. The software can then prioritize the responsiveness as a function of the priority of the received interrupt.

The ability to monitor and/or control functionality using software can be particularly useful for complex systems with multiple SSDs. For instance, systems using Redundant Array of Independent Disks (RAID) configurations divide and/or replicate data between multiple disks. The performance of the disks can be affected by the modification of the size of the volatile memory. Accordingly, the software can set the volatile memory size while considering the system implications for the particular RAID configuration. This can include, for example, setting the same volatile memory size for multiple drives. In this manner, the worst-case drive may set the volatile memory size for each of the other drives in the RAID unit.

In a particular embodiment of the present invention, the primary power source 402 can be enabled during the test if the PSE 412 proves insufficient. This can be accomplished by enabling the primary power source in response to the primary operating power dropping below a threshold voltage level. This functionality can be particularly useful for maintaining power during a test even should the PSE 412 prove to have failed or otherwise be insufficient.

Figure 5:
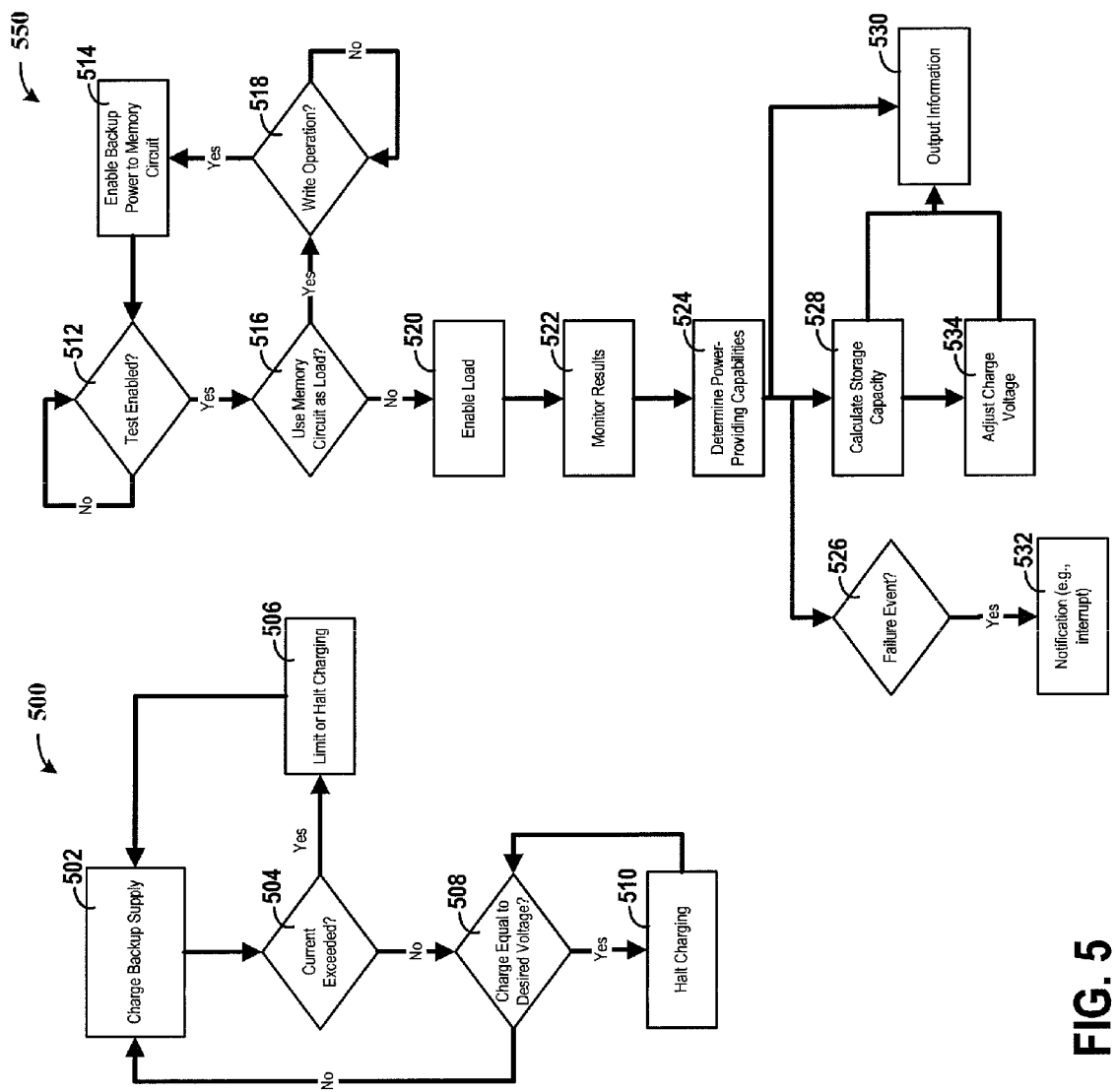
FIG. 5 depicts flow diagrams for implementing a data storage system, consistent with an embodiment of the present invention While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

FIG. 5 depicts flow diagrams for implementing a data storage system, consistent with an embodiment of the present invention. Flow diagram 500 relates to the charging 502 of the backup supply or PSE that is implemented at startup. In response to an inrush current setting, which can be set by an external controller or a default value, a determination is made as to whether the current limit has been exceeded 504. If the current limit is exceeded, then charging can be limited or temporarily halted 506. Limiting can be implemented by reducing the current using a variable impedance element or by alternatively enabling and disabling the charging of the PSE. A determination is also made 508 as to whether or not the charge on the PSE is at or above a desired voltage. If the charge is above the voltage, the charging can be halted 510, to be resumed if the voltage drops below a threshold level. If the voltage is not sufficient, charging can continue.

Flow diagram 550 relates to testing of a PSE. The test can be enabled 512 through any number of mechanisms. Non-limiting examples of enabling mechanisms include periodic testing, event-driven testing, an interrupt-driven testing or mode-controlled testing. Periodic testing can be implemented by setting a time-period between tests and enabling the test at the completion of each time period. This can be set as a default parameter, from an external controller or vary over the lifetime of the PSE (e.g., testing more frequently as the PSE degrades and becomes more likely to fail). Event-driven testing can be implemented in response to system events. These events might be in response to voltage, temperature or other factors. Interrupt-driven testing responds to a system interrupt that indicates a test is to be performed. The interrupt can be dedicated to the test or can be used in connection with another event that signifies testing should be implemented. For instance, certain system states, such as power-save modes in which memory is not being used, are amenable to testing. Mode-controlled testing allows for the data storage system to respond to requests from an external controller. The external controller can send a test-mode request indicating that a test should be performed.

In response to the test being enabled 512, an optional determination can be made as to whether or not the memory circuit is to be used 516. If the memory circuit is to be used, the testing can be implemented in accordance with the example implementations discussed in connection with FIG. 4. Variations upon such implementations are possible, however, as shown by the example flow diagram steps 518 and 514. At 518, the test waits for a write operation to occur, and in response, enables the backup power circuit to power the write operation 514. Once the write operation finishes, the test can be disabled. Since the backup function is almost exclusively write operations from the volatile memory to the non-volatile memory, the power requirements for a full-backup of the volatile memory can be extrapolated from the test results.

If the memory circuit is not to be used as the load, then a dedicated load is enabled 520. The system monitors the test results 522 and determines the power-providing capabilities from the test results 524. This information can then be output 530 and then used to set parameters of the memory accordingly. In the event that the PSE is determined to have significantly degraded to the point that it can be considered a failure event 526, notification 532 can be provided in the form of an interrupt or other communication. If desired, the storage capacity of the PSE can be calculated 528 and used to adjust the charge voltage 534 accordingly. This can be particularly useful when there is excess storage capacity that allows the charge voltage to be reduced. Such a reduction can significantly increase the life-expectancy of the PSE.

The specific algorithms and steps depicted and discussed herein are not limiting and are representative of a variety of different possible implementations. These steps can be implemented using programmable logic arrays, dedicated circuits, discrete logic, microprocessors executing instructions stored on a computer readable medium and combinations thereof.

The various embodiments described above are provided by way of illustration only and should not be construed to limit the invention. Based on the above discussion and illustrations, those skilled in the art will readily recognize that various modifications and changes may be made to the present invention without strictly following the exemplary embodiments and applications illustrated and described herein. Such modifications and changes do not depart from the true spirit and scope of the present invention, which is set forth in the following claims.

What is claimed is:

1. A method comprising:
   communicatively connecting an external control circuit with a data storage apparatus via an interface circuit, whereby the external control circuit is external to the data storage apparatus and data transfers between the external control circuit and the data storage apparatus pass through the interface circuit;
   temporarily storing data that is destined for a first solid-state memory circuit of the data storage apparatus in a second memory circuit of the data storage apparatus, the temporarily stored data being subject to data loss in the absence of electrical power;
   transferring, in the presence of power from the interface circuit, data stored in the second memory circuit to the first solid-state memory circuit;
   storing, in an energy-storage element, energy sufficient to, in the absence of power from the interface circuit, transfer data from the second memory circuit to the first solid-state memory circuit;
   using the external control circuit to generate a control signal indicative of insufficient power for the data storage apparatus and sending the control signal over the interface circuit;
   providing, in response to receiving the control signal, the stored energy to the second memory circuit;
   monitoring the electrical properties of the energy-storage element while a portion of the stored energy is discharged; and
   using the external control circuit to generate, in response to the monitored electrical properties, output data indicative of power-providing capabilities of the data storage apparatus to adjust allocations of memory available for temporary storage in the second memory circuit.

2. The method of claim 1, wherein the step of monitoring the electrical properties of the energy-storage element includes using the external control circuit to request status information periodically from the data storage apparatus.

3. The method of claim 1, wherein the interface circuit is a computer network interface and the data transfers between the external control circuit and the data storage apparatus pass through the computer network interface.

4. The method of claim 1, wherein the data storage apparatus includes one or more redundant arrays of independently powered memory units.

5. The method of claim 1, wherein monitoring the electrical properties of the energy-storage element includes monitoring power-providing capabilities of the storage element.

6. The method of claim 5, wherein modification of energy stored includes enabling a load circuit that provides electrical impedance for discharging the portion of the stored energy.

7. The method of claim 5, wherein monitoring power-providing capabilities of the storage element includes outputting data indicative of power-providing capabilities of the storage element being below threshold levels, and in response to the output data, setting an amount of memory available for temporary storage in the second memory circuit.

8. The method of claim 7, wherein the threshold levels are indicative of an amount of energy discharge.

9. The method of claim 1, wherein the interface circuit receives memory access requests from the external control circuit and writes the received memory access request to the second memory circuit.

10. The method of claim 1, wherein monitoring the electrical properties of the energy-storage element includes modifying how much energy is stored on the storage element by providing power to the first and second memory circuits during a data transfer operation that includes writing data from the second memory circuit to the first memory circuit.

11. The method of claim 1, wherein the energy-storage element includes at least one supercapacitor, and the data storage apparatus includes a charge control circuit that sets a charge-voltage level for the energy stored in the storage element in response to the output data received from the external control circuit.

12. The method of claim 1, wherein the data storage apparatus includes a charge control circuit for setting a charge-voltage level for the energy stored in the storage element in response to the power-providing output data and wherein the external control circuit is further configured and arranged to set an amount of memory available for temporary storage in response to the charge voltage level of the storage element.

13. The method of claim 1, wherein monitoring the electrical properties of the energy-storage element includes implementing a test in which
  data is written from the second memory circuit to a test location of the first memory circuit that is reserved for test purposes; and
  the energy storage element is discharged by providing power to the first and second memory circuits during a write from the second memory circuit to the first memory circuit.

14. The method of claim 1, wherein the external control circuit sets an amount of memory available for temporary storage in the second memory circuit by modifying a memory size that defines a frequency for erasures of the first solid-state memory circuit.

15. The method of claim 1, further including, based upon a signal indicative of power for the data storage apparatus being below a minimum threshold level, operating the data storage apparatus in a write-through mode whereby
  the energy-storage element is discharged, and
  data intended for temporary storage in the second memory circuit is written directly to the first solid-state memory circuit.

16. The method of claim 1, further including, based upon a control signal from the external control circuit, reducing a voltage stored in the energy-storage element to increase life-expectancy of the energy-storage element.

17. The method of claim 1, wherein monitoring the electrical properties of the energy-storage element includes implementing a test in which the data storage apparatus
  flushes data in the second memory circuit to the first solid-state memory circuit,
  enters a write-through mode whereby
    the energy-storage element is discharged by providing power to the first and second memory circuits, and
    data intended for temporary storage in the second memory circuit is concurrently written to the first solid-state memory circuit and the second memory circuit, and
  enters a normal operation mode after the test is complete and the energy-storage element has been recharged to a minimum threshold requirement for maintaining data integrity if power loss occurred.

18. A method comprising:
  communicatively connecting an external control circuit with a data storage apparatus via an interface circuit, whereby the external control circuit is external to the data storage apparatus and data transfers between the external control circuit and the data storage apparatus pass through the interface circuit;
  temporarily storing data that is destined for a first solid-state memory circuit of the data storage apparatus in a second memory circuit of the data storage apparatus, the temporarily stored data being subject to data loss in the absence of electrical power;
  storing, in an energy-storage element, energy sufficient to, in the absence of power from the interface circuit, transfer data from the second memory circuit to the first solid-state memory circuit;
  monitoring the energy-storage element to determine whether the energy-storage element contains sufficient power for operating, without data loss, the data storage apparatus in the absence of electrical power, including
    testing the storage element by partially discharging the energy stored on the storage element while monitoring power-providing capabilities of the storage element during the discharge of stored energy, and
    providing, in response to a discharge of an amount of the stored energy, output data to the external control circuit indicative of power-providing capabilities of the storage element, wherein the output data is indicative of the power-providing capabilities of the storage element being below a threshold level required to transmit a first amount of available memory for temporary storage, in the second memory circuit, to the first solid-state memory circuit in the event of main power failure; and in response to the output data, setting a second amount of available memory for temporary storage in the second memory circuit that is less than the first amount, and within the power-providing capabilities of the storage element to send the second amount of available memory for temporary storage, in the second memory circuit, to the first solid-state memory circuit in the event of main power failure.

* * * * *